US011191284B2

United States Patent
Schwenzow et al.

(10) Patent No.: US 11,191,284 B2
(45) Date of Patent: Dec. 7, 2021

(54) METHOD AND SYSTEM FOR CONTROLLING AND/OR REGULATING THE TREATMENT OF HEAT-SENSITIVE LIQUID FOOD PRODUCTS

(71) Applicant: GEA TDS GmbH, Sarstedt (DE)

(72) Inventors: Uwe Schwenzow, Ahaus (DE); Ludger Tacke, Velen (DE); Hubert Assing, Ahaus (DE); Helmut Buss, Heiden (DE); Ludger Leiwering, Laer (DE)

(73) Assignee: GEA TDS GmbH, Sarstedt (DE)

(*) Notice: Subject to any disclaimer, the term of this patent is extended or adjusted under 35 U.S.C. 154(b) by 0 days.

(21) Appl. No.: 16/609,049

(22) PCT Filed: Apr. 12, 2018

(86) PCT No.: PCT/EP2018/000198
§ 371 (c)(1),
(2) Date: Oct. 28, 2019

(87) PCT Pub. No.: WO2018/197036
PCT Pub. Date: Nov. 1, 2018

(65) Prior Publication Data
US 2020/0146305 A1 May 14, 2020

(30) Foreign Application Priority Data
Apr. 29, 2017 (DE) .......................... 102017004213.6

(51) Int. Cl.
*A23C 3/037* (2006.01)
*A23L 3/22* (2006.01)

(52) U.S. Cl.
CPC ................ *A23C 3/037* (2013.01); *A23L 3/22* (2013.01); *A23V 2002/00* (2013.01)

(58) Field of Classification Search
CPC ........ A23C 3/037; A23L 3/22; A23V 2002/00
See application file for complete search history.

(56) References Cited

U.S. PATENT DOCUMENTS 3,230,095 A * 1/1966 Stewart, Jr. ............... A23L 3/18
426/476
3,259,071 A * 7/1966 Nellis ................... F04D 29/628
415/175
(Continued)

FOREIGN PATENT DOCUMENTS

EP 0 794 706 B1 8/2000
JP S51-023801 U 2/1976
(Continued)

OTHER PUBLICATIONS

Japanese Office Action in Japanese Patent Application No. 2019-556919, dated Dec. 24, 2020, 8 pgs.with English translation.

*Primary Examiner* — Steven N Leff
(74) *Attorney, Agent, or Firm* — Young Basile Hanlon & MacFarlane, P.C.

(57) ABSTRACT

Controlling and/or treating heat-sensitive liquid food products ensures improved control of a filling level in an infuser container. Therefore, a constant dwell time of the product to be heated is reached in the event of product-fouling in the centrifugal pump. The pump is designed such that one part of a volume flow of the product, transported by an impeller wheel, regularly rinses the impeller wheel and the areas of a pump chamber that are directly adjacent to the impeller wheel. A reduction in the volume flow of the centrifugal pump is then counteracted by increasing the initial rotational speed if the reduction is simultaneously associated with a drop in temperature of the product. The increase of the initial rotational speed is carried according to the drop in temperature of the product and/or an increase in the temperature of the steam to constantly maintain at least the temperature of the product.

20 Claims, 5 Drawing Sheets

(56) References Cited

U.S. PATENT DOCUMENTS

| | | | |
|---|---|---|---|
| 5,881,638 A * | 3/1999 | Kjaerulff | A23C 3/0375 99/453 |
| 2004/0062635 A1 | 4/2004 | Serio | |
| 2008/0160149 A1* | 7/2008 | Nasrallah | A23L 3/16 426/521 |
| 2010/0065259 A1* | 3/2010 | Hikita | F04D 7/06 165/104.34 |
| 2012/0027901 A1 | 2/2012 | Kjerbye et al. | |
| 2012/0321771 A1* | 12/2012 | Kowalik | A23L 3/18 426/511 |
| 2015/0030497 A1* | 1/2015 | Osada | A23L 3/16 422/1 |

FOREIGN PATENT DOCUMENTS

| | | |
|---|---|---|
| JP | 2008-121937 A | 5/2008 |
| WO | 2016/012026 A1 | 1/2016 |

* cited by examiner

METHOD AND SYSTEM FOR CONTROLLING AND/OR REGULATING THE TREATMENT OF HEAT-SENSITIVE LIQUID FOOD PRODUCTS

CROSS-REFERENCE TO RELATED APPLICATIONS

This application is a National Phase Application of PCT International Application No. PCT/EP2018/000198, International Filing Date, Apr. 12 2018, claiming priority to German Patent Application No. 102017004213.6, filed Apr. 29 2017, each of which is hereby incorporated by reference in its entirety.

TECHNICAL FIELD

The invention relates to a method and a system for controlling and/or regulating the treatment of heat-sensitive liquid food products such as whey protein concentrate, baby food, liquid baby food concentrates, nutritious beverages or dairy milk, wherein steam directly heats the liquid food product to establish a germ-free state in an infuser container, wherein water is removed from the liquid food product by flash evaporation at a low pressure in an amount which corresponds to that of the previously supplied steam, wherein the liquid food product is delivered by means of a centrifugal pump between heating and flash evaporation, wherein the liquid food product undergoes cooling in at least one section of this flow path by each of the associated walls bordering this flow path starting upon entry into a base region of the infuser container and at most until entering the centrifugal pump. Moreover, the invention relates to a centrifugal pump for such a system.

BACKGROUND

Heat-sensitive liquid food products of the aforementioned type contain a relatively large amount of protein, a large amount of dry mass and little water, and they may possess a low, average, or high viscosity. The term "heat sensitivity" should be understood in the following to mean that these food products, preferably at temperatures above 100° C., tend to collect up to baking on, i.e., to form a coating on critical walls under these conditions, i.e., the walls of the infuser container, the centrifugal pump conveying them, and on the walls of the flow path connecting the infuser container with the centrifugal pump. This coating formation is also termed product fouling. Product fouling reduces the service life, or respectively the operating time of the infuser container and in particular the centrifugal pump between two cleaning cycles. The baking on of the heated liquid food product on the critical walls is counteracted by cooling these walls.

Particularly critical regions of a heating system with an infuser container and a delivery apparatus designed in whatever manner and arranged downstream from the infuser container, are the bottom region of the infuser container that tapers downward to an outlet opening, and the delivery apparatus. The delivery apparatus can be a rotating displacement pump known per se such as a gear pump, vane pump, impeller pump or rotary pump. The rotating displacement pump is generally arranged directly at the outlet opening because unproblematic regulation of a desired minimum fill level in the infuser container is possible due to the specific rotary-speed-dependent volumetric flow of this pump type. The arrangement of a gear pump is known from EP 0 794 706 B1, wherein its housing has a cooling system, and the housing directly adjoins the outlet opening of the infuser container. Depending on the design, a gear pump possesses an ability to clean itself because the gears mesh tightly with each other and scrape along the associated housing walls and thereby prevent gradually accumulating formation of a coating (product fouling).

It has, however, already been proposed to use a delivery apparatus designed as a centrifugal pump, wherein this is generally arranged above a drainpipe terminating at the outlet opening and extending downward, and accordingly at a distance from the infuser container. Such a distance that represents an additional liquid reservoir in the drainpipe between the outlet opening and the entrance into the centrifugal pump is necessary in order to achieve sufficiently reliable fill level regulation in the infuser container. A fluctuating fill level in the bottom region of the infuser container leads to an undesirable and undefined dwell time at that location; a lowering of the fill level to the entrance of the centrifugal pump can cause vapor to be sucked into the centrifugal pump and hence can cause undesired cavitation. Undefined dwell times and cavitation cause a reduction in the quality of the liquid food product.

In WO 2016/012026 A1, the system for heat-treating heat-sensitive liquid foods known from EP 0 794 706 B1 is modified in that, with an otherwise unchanged configuration of the individual assemblies of the system, the cooling jacket surrounding the bottom of the infuser container that serves to cool this bottom extends underneath the pump and, according to an advantageous embodiment, into the pump housing. The pump is a displacement pump, preferably a gear pump or piston pump. However, a centrifugal pump is also claimed without indicating how this centrifugal pump is designed. It can therefore be assumed that a conventional and hydraulically optimized centrifugal pump is provided whose basic design is known to the expert.

A centrifugal pump for unproblematic liquid food products such as water has a basic design that is sufficiently known. It is designed and configured such that it possesses maximum hydraulic efficiency, i.e., it achieves a maximum product of the volumetric flow times the delivery rate with a given drive energy. In a pump housing generally consisting of at least two housing parts, an impeller wheel with blades is arranged on a shaft. Inside the pump housing, a guide apparatus in the form of, for example, a spiral housing or a blade-free annular space adjoins the outside of a ring-shaped, surrounding impeller wheel exit cross-section. Located on the suction-side housing part, a housing cover, is an inlet coaxial to the impeller wheel axis said inlet being generally designed as a so-called suction port, and an outlet that preferably discharges tangentially in the perimeter and is generally designed as a so-called pressure port. An impeller wheel pressure side forms a so-called rear wheel side chamber with the housing part, a housing rear wall, facing away from the suction side which generally has a short axial extension to achieve good hydraulic efficiency by the centrifugal pump. This axial or gap-wide extension is generally dimensioned short enough to ensure the mechanical functioning of the centrifugal pump given appropriate production tolerances. In the same way, the impeller wheel front side, and in this case this is the front end-face blade edges of an open impeller wheel, is adapted to the contour of the housing cover with a very narrow gap. To reduce an axial force that results from the pressures acting on both sides of the impeller wheel, a plurality of pressure compensation holes with a relatively small diameter are arranged in the hub region of the impeller wheel and distributed over its circumference.

With heat-sensitive liquid food products of the aforementioned type, the primary goal is for there to be a minimum tendency to deposit on the walls of the centrifugal pump while the products are being delivered by a centrifugal pump. For example, when directly heating very heat-sensitive liquid food products in an infuser container and then discharging the heated liquid food products out of the infuser container by means of a downstream centrifugal pump of the usual design, i.e., hydraulically optimized design, it was revealed that this centrifugal pump becomes clogged within a very short time, that is, clogged within seconds to a few minutes, by product fouling, and therefore stops operating. Particularly critical regions are the intake region of the impeller wheel because undissolved gases and, in particular, non-condensed steam enhance product fouling here, and the narrow, gap-wide rear wheel side chamber.

A satisfactory solution remains unknown for the specific design of a centrifugal pump in a system for treating heat-sensitive liquid food products in which the latter undergo direct heating by means of culinary steam.

In known systems in which a centrifugal pump is connected by a drainpipe to the outlet opening of the infuser container, fill level regulation is required in the region of the outlet opening and the drainpipe that is used to control and/or regulate the operating phase of the system. With this type of control and/or regulation, it was revealed that fill level fluctuations in the drainpipe unavoidably occur and cannot be prevented. These fill level fluctuations cause dwell time fluctuations in the infuser container and the drainpipe connecting thereto that comprise 15 to 20% of the dwell time in this region of the liquid food product to be heated directly. If the fill level is too high, then the exposure time of the liquid food product to the steam is insufficient with this necessarily reduced drop height, the desired product temperature setpoint is not reached, and vapor bubbles inclusions remain in the insufficiently heated liquid food product. If a fill level is too low, on the one hand the product temperature setpoint is exceeded, and on the other hand the danger exists of vapor being sucked into the centrifugal pump which can produce cavitation there with harmful consequences to the liquid food product and the centrifugal pump.

Vapor bubble inclusions from fluctuations in the fill level and hence dwell time lead to increased product fouling, in particular on the blades of the centrifugal pump. Product fouling generally causes a shortening of the operating phase of the system, wherein the duration of the operating phase is also termed the service life of the system. The service life is equivalent with the length of time between two cleaning cycles of the system for eliminating product fouling. Lengthening the service life is, however, generally desirable, not just because of a lengthening of the operating phase for the aforementioned reasons; a lengthening of the service life that results from less quantitative product fouling over time also yields greater product quality because protein and fat in the liquid food product are less damaged, or respectively influenced.

The cooling of the centrifugal pump also has a significant influence on the service life. As presented above, product fouling occurs at this location in particular in the intake region of the impeller wheel because undissolved gases and in particular non-condensed steam enhance product fouling at this location, and in the narrow, gap-wide rear wheel side chamber. Cooling these regions causes a lengthening of the service life but cannot prevent product fouling on the blades of the centrifugal pump; instead, it can only inhibit the growth of product fouling. This product fouling necessarily yields a reduction of the throughput of the centrifugal pump because passage cross-sections constrict, and friction resistances in the regions of the flow close to the wall increase, which further enhances the fill level fluctuations and hence dwell time fluctuations in the relevant parts of the system which are already problematic.

BRIEF SUMMARY

It is an object of the present invention to create a method for controlling and/or regulating the treatment of heat-sensitive liquid food products, a system for carrying out the method, as well as a centrifugal pump for this system by means of which an improvement in fill level regulation in the infuser container and hence a constant dwell time of the liquid food product to be heated is achieved in the event of growing product fouling in the centrifugal pump. An additional object consists of modifying a preferably commercially available centrifugal pump such that it inhibits the growth of product fouling therein and contributes to the lengthening of the service life.

In terms of process engineering, the invention includes a method for controlling and/or regulating the treatment of heat-sensitive liquid food products, wherein steam directly heats the liquid food product to establish a germ-free state in an infuser container, wherein water is removed from the liquid food product by flash evaporation at a low pressure in an amount which corresponds to that of the previously supplied steam. In the method, the liquid food product is delivered by means of a centrifugal pump between heating and flash evaporation, and the liquid food product undergoes cooling in at least one section of this flow path by each of the associated walls bordering this flow path starting upon entry into a base region of the infuser container and at most until entering the centrifugal pump.

An underlying object of the invention is achieved when, in the method of the generic type during the treatment known per se of the liquid food product to be directly heated, on the one hand a centrifugal pump is used with an impeller wheel rotatably accommodated in a pump chamber, wherein the centrifugal pump is designed such that part of a volumetric flow of the liquid food product, delivered by the impeller wheel, serves to rinse the impeller wheel itself and the regions of the pump chamber as specified that are directly adjacent to the impeller wheel.

On the other hand, the following treatment steps (a) to (e) according to the method herein are provided as follows.

(a) A product temperature detected downstream after the centrifugal pump of an infuser-heated liquid food product is regulated by steam at a steam temperature that is supplied to a head region of the infuser container to a product-specific product temperature setpoint to be achieved as specified. In so doing, a drop in the product temperature causes a rise, and a rise in the product temperature causes a drop, in the steam temperature in a manner known per se.

(b) In an initial phase of the treatment of the liquid food product, the centrifugal pump is operated at an initial rotational speed lying below a rated rotational speed of the centrifugal pump by a predetermined amount. This initial rotational speed depends on the liquid food product and/or on the design of the centrifugal pump, i.e., on the extent of the specified rinsing, or respectively the rinsing volumetric flows in the pump chamber and in the impeller wheel itself.

(c) A reduction of the volumetric flow of the centrifugal pump is then counteracted by an increase in the initial rotational speed when said reduction occurs at the same time as a drop in the product temperature.

(d) The initial rotational speed is increased depending on a drop of the product temperature, and/or a rise of the steam temperature. In so doing, the respective extent of increasing the initial rotational speed results from the regulatory necessity of keeping at least the product temperature constant during the respective application. The respective initial rotational speed is generally determined by empirical values obtained experimentally beforehand for the respective liquid food product.

(e) Steps (c) and (d) are repeatedly executed until the specified product temperature setpoint (T2(S)) to be achieved, and/or the steam temperature (T1) needed to achieve the product temperature set point (T2(S)) at the start of treatment, consistently occur/occurs.

The inventive basic concept is founded on the insight that changes in the fill level are the result of disturbance variables, of which product fouling on the blades of the centrifugal pump is an essential one. This product fouling necessarily reduces the volumetric flow in the centrifugal pump and, without counteracting measures, such as without increasing the drive performance of the centrifugal pump for the purpose of retaining the desired volumetric flow, leads to an increase in the fill level in the infuser container. Maintaining a specified volumetric flow under these conditions requires an increase in the rotational speed and thus the noted increase in the drive performance. This necessary increase in the fill level occurs indirectly through a drop in the product temperature and, as a consequence, indirectly through a rise in temperature in the infuser container. In summary, the method according to the teachings herein exploits the following causal relationships.

First, the gradually growing product fouling on the walls between an outlet opening of the infuser container and an exit from the centrifugal pump leads to a reduction in the volumetric flow passing through this region.

Second, if the system is supposed to be operated at a constant volumetric flow, the product fouling in this region causes an increase in the drive performance due to the required increase in rotational speed or, if the required increase in rotational speed does not occur, causes a reduction in the volumetric flow.

Third, the reduction of the volumetric flow under these conditions leads to an increase in the fill level in the infuser container and thus to a temperature drop in the infuser-heated liquid food product because the steam in the available fall time, or respectively exposure time cannot, as before, transfer its enthalpy to the liquid food product to be heated.

Fourth, as a consequence of the temperature drop in the infuser-heated liquid food product, there is a rise in the steam temperature and hence, for reasons of control engineering, necessarily a temperature rise in the infuser container.

Accordingly it is possible to not just use the change in the fill level in the infuser container itself which is costly to detect, but rather to use the effects of these fill level changes, which are much easier to detect, by themselves or in addition to regulate the fill level, and hence to control and/or to regulate the treatment of heat-sensitive liquid food products in the relevant system.

The teachings herein provide that the increase in the initial rotational speed can occur steadily, wherein according to another proposal, an increase thereof is carried out such that the gradient of the steady increase in the initial rotational speed results from the regulatory requirements, i.e., from the given control requirements in the respective specific application, and is adjusted depending on the drop in temperature of the product temperature, and/or the rise in temperature of the steam temperature, and/or the product-specific requirements.

Alternatively to steadily increasing the initial rotational speed, this disclosure proposes a stepwise increase, wherein the increase is carried out in at least one discrete step with a rotational speed differential that results from the regulatory requirements, i.e., from the given control requirements in the respective specific application. In this regard, another proposal provides adjusting the rotational speed differential, depending on the drop in temperature of the product temperature and/or the rise in temperature of the steam temperature, and/or product-specific requirements.

The invention proposes another process engineering embodiment according to which the initial rotational speed and/or the product temperature setpoint are, or respectively is set depending on default parameters that are characteristic of the liquid food product, wherein "default parameters" are understood to be the physical variables such as density, viscosity and thermal conductivity of the liquid food product, and/or its composition such as the portion of fat and protein. The proposed method can therefore be adapted to the special needs of the liquid food product to be heated.

Because the method cannot be operated dissociated from the physical boundary conditions to which it is subjected, another process engineering embodiment moreover provides that the initial rotational speed and/or the product temperature setpoint are, or respectively is adjusted depending on the physical boundary conditions to which the method is subjected, wherein the "physical boundary conditions" of the method are understood to be process-related default parameters of the method such as pressure and temperature.

Another embodiment of the method provides that the initial rotational speed, and/or the product temperature setpoint, and/or the rotational speed differential, and/or alternatively to the rotational speed differential, the gradient of the steady increase in the initial rotational speed are, or respectively is adjusted by means of a calibration function tested and saved before or while starting the method. The control and/or regulation of the treatment of the liquid food product in line with obtained product-specific empirical values can thereby be supported in a time-saving and cost-saving manner and operated with high quality for the liquid food product.

The method can also be used for an infuser container in which the liquid food product is supplied annularly, and is impinged on from the inside by internal steam which is the subject of the main claim, and from the outside by external steam. In this case, the supply of the external steam is adjusted depending on a required supply pressure for the internal steam in the head region of the infuser container, and by differential pressure regulation.

A system for controlling and/or regulating the treatment of heat-sensitive liquid food products is based in a manner known per se on an infuser container in the headspace of which a steam line for steam and a product inlet terminate, a vacuum chamber fluidically connected to the infuser container by a connecting line, a centrifugal pump arranged in the connection line, an outlet opening arranged in a bottom of the infuser container, and a drainpipe connecting to the outlet opening and terminating in the centrifugal pump. A container-bottom-side coolant chamber, and furthermore a pump-housing-side coolant chamber, and/or a drainpipe-side coolant chamber are provided for cooling.

An underlying object of the invention is achieved by a system that is characterized by the following features that go beyond generic features.

A centrifugal pump is provided that has an impeller wheel which is rotatably accommodated in a pump chamber in a manner known per se and that is designed such that part of a volumetric flow of the liquid food product, delivered by the impeller wheel, serves to rinse the impeller wheel itself and the regions of the pump chamber as specified that are directly adjacent to the impeller wheel.

Downstream directly after the centrifugal pump, a temperature regulating apparatus is provided in the connecting line, which is configured to regulate a product temperature and interacts with a control valve arranged in the steam line.

Downstream after the control valve, a temperature measuring apparatus is provided in the steam line for a steam temperature.

The centrifugal pump is assigned a rotational speed regulating apparatus for regulating a rotational speed of the centrifugal pump.

A control and regulating apparatus is provided that adjusts a product-specific initial rotational speed of the centrifugal pump and the steam temperature, and executes an increase in the initial rotational speed in conjunction with the temperature regulating apparatus, the control valve, the temperature measuring apparatus and the rotational speed regulating apparatus.

The seamless cooling of the heated liquid food product is achieved as provided in an initial proposal in this regard when the container-bottom-side coolant chamber, the drainpipe-side coolant chamber, and the pump-housing-side coolant chamber undergo cooling separately from each other. With regards to cooling, a second proposal that reduces the cooling effort provides that at least two coolant chambers are series-connected with each other and undergo cooling in a countercurrent to an infuser-heated food product.

A centrifugal pump according to the invention that is suitable for a system to control and/or regulate the treatment of heat-sensitive liquid food products is based on a centrifugal pump which is known per se with an inlet, an outlet, a pump housing that is formed by at least a housing cover and a housing rear wall. It is also based on the pump chamber formed in the pump housing and in fluidic connection with the inlet and the outlet, the impeller wheel that is rotatably accommodated in the pump chamber and is designed open toward the housing cover and closed to the housing rear wall by a rear side of the impeller wheel, a front impeller wheel gap provided between the housing cover and the impeller wheel, and a rear impeller wheel gap provided between the housing rear wall and the impeller wheel.

The inventive basic idea consists of rinsing the impeller wheel itself and its adjacent critical regions up to the immediate pump-housing-side edge of the impeller wheel front side and the impeller wheel rear side with the infuser-heated and hence treated liquid food product to be delivered, and thereby inhibiting product fouling at that location because said pump-housing-side edges are, or respectively can be simultaneously cooled in a manner known per se during the rinsing.

The treated liquid food product accordingly serves to rinse the pump housing and the impeller wheel itself as specified with part of its volumetric flow delivered in the impeller wheel. In so doing, the volumetric flows of the specified rinsing exceed by several times the necessary compensating flows in the pump housing that result from a normal hydraulically optimized design of the centrifugal pump. The tendency of liquid food product to bake onto the walls of the centrifugal pump is reduced by the cooling. This is accomplished by a specified sacrifice of optimum hydraulic efficiency. In the centrifugal pump according to the teachings herein, a volumetric flow is delivered in the impeller wheel which is increased by the sum of all more-or-less recirculating rinsing volumetric flows than the volumetric flow drawn by the suction port. The rinsing volumetric flows generated during the specified rinsing guide volumes from the core of the blade channels to the cooled walls of the pump housing and from there back into the impeller wheel, wherein the cooling action condenses non-condensed steam and thereby reduces the tendency of product fouling.

The above-described interrelationships reveal that a centrifugal pump which is rinsed with the liquid food product that it delivers possesses an impeller wheel whose hydraulic output relative to the impeller wheel must be greater than the hydraulic output of the centrifugal pump that actually ultimately occurs at the pressure port. If a hydraulically-optimized centrifugal pump is chosen to realize a rinsed centrifugal pump of the relevant kind, then its rated output must be chosen to be correspondingly higher by the aforementioned difference in output. Given the same rated output, an outer impeller wheel diameter of the rinsed centrifugal pump must therefore be larger than one for a hydraulically optimized centrifugal pump.

The specific solution for implementing the aforementioned inventive basic ideas consists of designing the impeller wheel in a manner known per se as an impeller wheel which is designed open toward the housing cover and closed to the housing rear wall by a rear side of the impeller wheel. Moreover, the front impeller wheel gap is increased up to several times in comparison to a minimum front impeller wheel gap that ensures the mechanical functioning of the centrifugal pump by reducing the width of the impeller wheel. This increase is configured such that the front impeller wheel gap undergoes a maximum increase at an outer diameter of the impeller wheel that decreases steadily to the minimum front impeller wheel gap into the region of the entrance into the blade channels of the impeller wheel, and the reduction of the width of the impeller wheel at the outer diameter of the impeller wheel is 40 to 50% of the width of a hydraulically optimized impeller wheel. In the region of the front impeller wheel gap, a second rinsing flow forms that extends out of the region of the outlet into the region of the inlet of the impeller wheel. Due to the enlargement of the front impeller wheel gap, the flow is significantly increased around the front edge of the blades of the open impeller wheel that exists there even when the impeller wheel gap is narrow, driven by the difference in pressure between the pressure side and suction side of the blade which generates a third rinsing flow as specified.

Each blade channel of the impeller wheel between two adjacent blades is fluidically connected to the rear impeller wheel gap in the region of its adjacent impeller wheel rear side by at least one rinsing hole that penetrates the impeller wheel rear side. The position, designed shape and dimensions of the rinsing hole are features by means of which an associated first rinsing flow is established with respect to its radial penetration depth, its shape and quantitative intensity. When a rinsing hole is arranged in each blade channel, it is useful with regards to flow and production if all of these rinsing holes are arranged on a circle of holes with corresponding spacing. With respect to the positioning of the rinsing hole, it has proven to be advantageous when the geometric location of the respective penetration site of the rinsing hole in the impeller wheel rear side that also determines the hole circle diameter is approximately through the middle of the blade channel relative to the distance of the blades at the penetration site, and approximately through the middle of a maximum flow thread length of the blade channel between its entrance and exit.

With regards to the dimension of the rear impeller wheel gap, it has proven to be useful when the access to a minimum rear, radially-oriented impeller wheel gap that ensures the mechanical functioning of the centrifugal pump and that begins at the outer diameter of the impeller wheel is increased by up to 5 mm by reducing the outer diameter of the impeller wheel. Moreover, the rear impeller wheel gap is enlarged in that the impeller wheel rear side undergoes an annular drilling out in the region between the rinsing hole and a hub of the impeller wheel with an axial depth of up to 2 mm.

The generation of the desired and necessary first and second rinsing flow is only enabled by the enlargement of this impeller wheel gap. The respective width of the front and rear impeller wheel gap can be dimensioned depending on the specific properties of the liquid food product.

The rinsing hole in the most general case comprises passages of any shape, i.e., a circular shape that is easy to produce is not essential. The rinsing hole is either designed circular with a hole diameter, or it has a shape that deviates from the circular shape with a hydraulic diameter that is essential for this shape. It has proven to be useful if the hole diameter or the hydraulic diameter is 30 to 50%, and in this region preferably 40 to 50%, of the spacing of the blades at the penetration site.

BRIEF DESCRIPTION OF THE DRAWINGS

A more detailed representation of the invention is evident from the following description and the attached figures in the drawings as well as from the claims. Whereas the invention is realized in a wide range of designs of a method of the type described above and a wide range of embodiments of a system for performing the method, an embodiment of a system according to the invention, and its control and regulation according to the invention, as well as a centrifugal pump according to the invention for such a system, will be described below with reference to the drawing figures.

DETAILED DESCRIPTION

Figure 1:
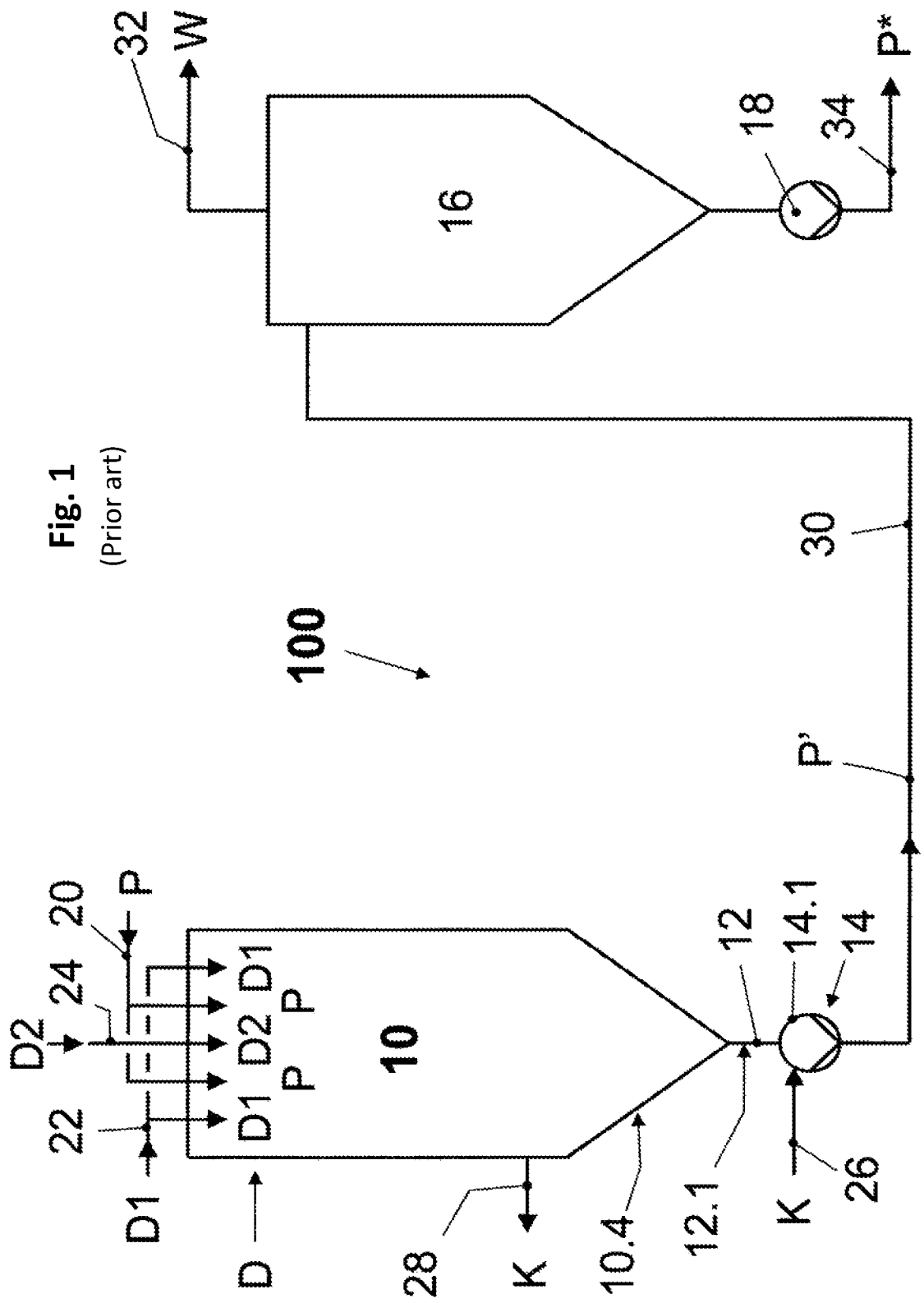
FIG. 1 shows a schematic representation of a system for treating heat-sensitive liquid food products according to the prior art.

A system 100 known from the prior art according to FIG. 1 (such as WO 2016/012026 A1) contains an infuser container 10 as described for example in WO 2010/086082 A1 and that has a product inlet 20 in its headspace through which a liquid food product P that is to be heat-treated is supplied to this infuser container 10 centrally and annularly. The liquid food product P supplied in this manner is also supplied with steam D for direct heating through the headspace of the infuser container 10, namely a first steam D1 radially from the outside through an external steam inlet 22, and a second steam D2 radially from the inside through an internal steam inlet 24.

The infuser container 10 is bordered at its bottom tapering downward toward an outlet opening by a container-bottom-side coolant chamber 10.4. The outlet opening of the infuser container 10 is connected by a drainpipe 12 that is surrounded by a drainpipe-side coolant chamber 12.1 to a first delivery apparatus 14 that is designed as a displacement pump, preferably as a rotating displacement pump, and is arranged in a connecting line 30 leading from the first delivery apparatus 14 to an entrance into a vacuum chamber 16. The first delivery apparatus 14 possesses a pump-housing-side coolant chamber 14.1.

The pump-housing-side coolant chamber 14.1 is supplied coolant to cool K it through a pump-side coolant entrance 26 which then flows through the drainpipe-side coolant chamber 12.1 to cool K it, and finally enters the container-bottom-side coolant chamber 10.4 to cool K the bottom of the infuser container 10. The coolant is discharged through an infuser-side coolant exit 28.

The delivery apparatus 14 delivers an infusion-heated liquid food product P' from the infuser container 10 to the vacuum chamber 16. The vacuum chamber 16 is designed to remove the amount of water W from the infusion-heated liquid food product P' that cools from the reduction in pressure as so-called flash steam that is supplied in the form of steam D, in the present case consisting of the first steam D1 and the second steam D2, to the infuser container 10. The water W is withdrawn through a vapor exit 32 preferably arranged in the top region of the vacuum chamber 16. A liquid food product P* treated in this manner leaves the vacuum chamber 16 through a drain line 34 preferably arranged in the bottom region in a tapering bottom along the way through a second delivery apparatus 18 that is preferably designed as a centrifugal pump.

Figure 2:
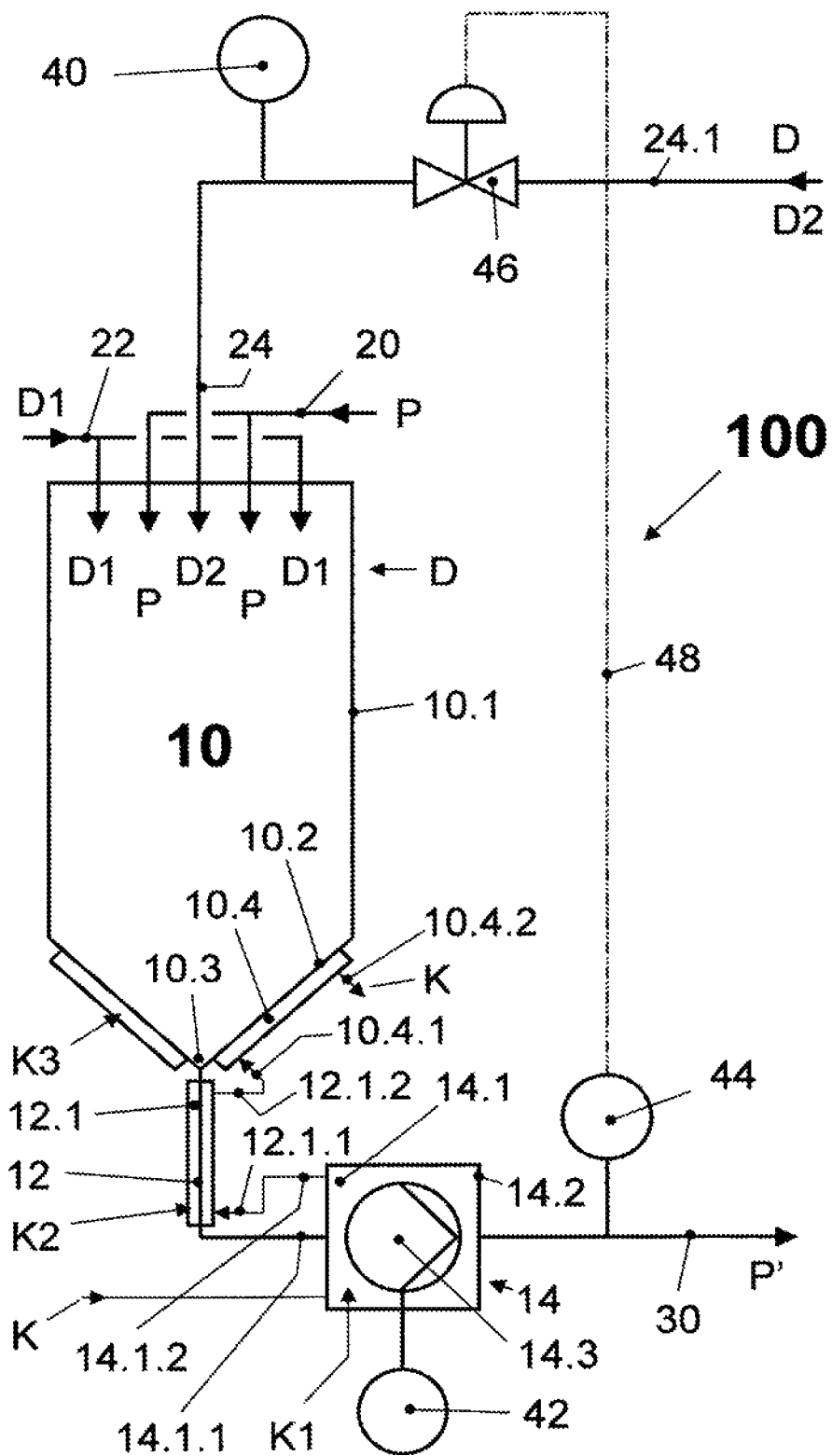
FIG. 2 shows a schematic representation of a section of a system for controlling and/or regulating the treatment of heat-sensitive liquid food products according to an embodiment of the invention in the region of an infuser container for directly heating the liquid food product in direct connection with a centrifugal pump.

FIG. 2 shows a schematic representation of a section of a system 100 for controlling and/or regulating the treatment of heat-sensitive liquid food products P in the region of an infuser container 10 for directly heating the liquid food product P. The infuser container 10 selected as an example is of the same design and is supplied in the same manner with steam D, or respectively D1, D2 and the liquid food product P as is the case according to FIG. 1. It has a preferably cylindrical container jacket 10.1 and a container bottom 10.2 adjacent thereto and tapering downward into an outlet opening 10.3, wherein the container bottom 10.2 is bordered by the container-bottom-side coolant chamber 10.4. The outlet opening 10.3 is connected by the drainpipe 12 surrounded by the drainpipe-side coolant chamber 12.1 to the first delivery apparatus 14 designed as a centrifugal pump. The pump-housing-side coolant chamber 14.1 extends into a pump housing 14.2 of the centrifugal pump 14 that rotatably accommodates an impeller wheel 14.3.

The coolant chambers 10.4, 12.1 and 14.1 are preferably series-connected to each other and undergo cooling K in a countercurrent to an infuser-heated liquid food product P' that leaves the centrifugal pump 14 through the connecting line 30 and flows toward the vacuum chamber 16. A first cooling K1 comprises the pump-housing-side coolant chamber 14.1 on the way from a first coolant entrance 14.1.1 to a first coolant exit 14.1.2. A second cooling K2 concerns the drainpipe-side coolant chamber 12.1 on the way from a second coolant entrance 12.1.1 to a second coolant exit 12.1.2. A third cooling K3 comprises the container-bottom-side coolant chamber 10.4 on the way from a third coolant entrance 10.4.1 to a third coolant exit 10.4.2.

The internal steam inlet 24 for supplying steam D or internal steam D2 to the infuser container 10 is connected to a steam line 24.1. Downstream directly after the centrifugal pump 14 (FIG. 3), there is a temperature regulating apparatus 44 in the connecting line 30 that is configured to regulate ("C") a product temperature T2 or a product temperature setpoint T2(S) with the additional capability of displaying ("I") a temperature ("T") (→TIC), and that interacts through a control and regulating apparatus 50 with a control valve 46 arranged in the steam line 24.1. Downstream after the control valve 46, a temperature measuring apparatus 40 is provided in the steam line 24.1 for a steam temperature T1 or a steam temperature setpoint T1(S) with the capability of displaying ("I") a temperature ("T") and initiating an error message ("A") in this regard (→TIA). The centrifugal pump 14 is assigned a rotational speed regulating apparatus 42 for regulating ("C") a rotational speed n ("S") of the centrifugal pump 14 (→SC). Signals for controlling and/or regulating are transmitted through signal lines, of which one signal line 48 is shown as an example.

A liquid level N of an infuser-heated liquid food product P' is drawn as an example in the infuser container 10, wherein a change in a liquid level Δh that can also extend into the drainpipe 12 is to be minimized by a method according to the invention. An available drop height h for the liquid food product P to be heated that should be kept as constant as possible necessarily results from the position of the liquid level N, or respectively the changes in the liquid level Δh. The centrifugal pump 14 generates a delivery pressure of the centrifugal pump p(14) at its pressure-side exit in the connecting line 30.

The control and regulating apparatus 50 has connections a, b, c, d, by means of which they are connected to the associated connections a, b, c, d of the temperature measuring apparatus 40, the rotational speed regulating apparatus 42 and the temperature regulating apparatus 44 and the control valve 46 for signaling and controlling. The control and regulating apparatus 50, in cooperation with the temperature measuring apparatus, the rotational speed regulating apparatus and the temperature regulating apparatus 40, 42, 44 and the control valve 46, sets a product-specific initial rotational speed n(o) of the centrifugal pump 14 and the steam temperature T1, and executes an increase in the rotational speed n starting from the initial rotational speed n(o).

Figure 3:
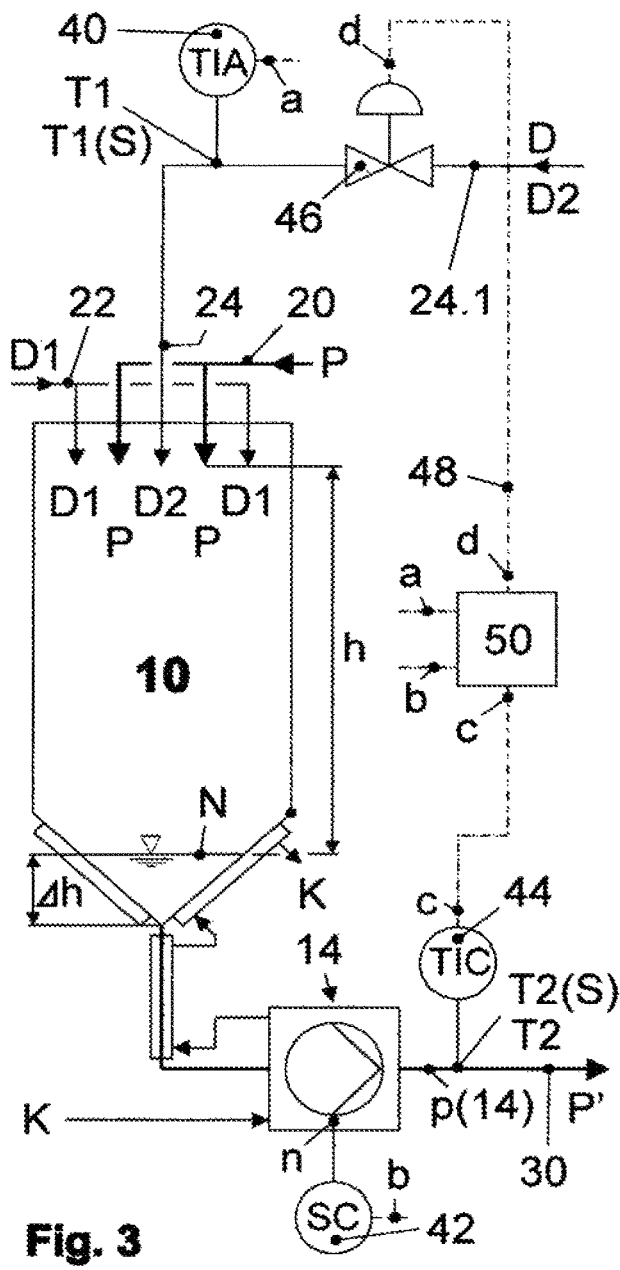
FIG. 3 shows a schematic representation of the section from the system according to FIG. 2 with indications of the control and/or regulation of the treatment of heat-sensitive liquid food products.

The qualitative diagrams in FIGS. 4 to 7 in conjunction with FIG. 3 serve to explain a method for controlling and/or regulating the treatment of heat-sensitive liquid food products P, wherein this can be accomplished with a system 100 designed as an example according to FIG. 2. The basic method for directly heating a liquid food product P by means of steam has already been sufficiently described by way of introduction. The solution to the object, namely to achieve an improvement of fill-level regulation and hence a constant dwell time of the liquid food product P to be heated in the event of increasing product fouling F in the centrifugal pump 14, will be described below.

Operating Phase

In a trouble-free operating phase of the system 100 (see FIG. 3), the product temperature T2 of the infuser-heated liquid food product P' detected downstream after the centrifugal pump 14 is regulated to the product-specific product temperature setpoint T2(S) to be achieved as specified. This is accomplished by the regulated supply of steam D, or respectively D1, D2 at steam temperature T1 which in this case corresponds to the steam temperature setpoint T1(S). The supply occurs in the head region of the infuser container 10 by means of the temperature regulating apparatus 44 in collaboration with the control and regulating apparatus 50 and the control valve 46. In a manner known per se, a drop in the product temperature T2 from the product temperature setpoint T2(S) causes a rise, and a rise in the product temperature T2 relative to the product temperature setpoint T2(S) causes a drop, in the steam temperature T1, i.e., a respective deviation from the specified steam temperature setpoint T1(S) to be adjusted.

Initial Phase

Figure 4:
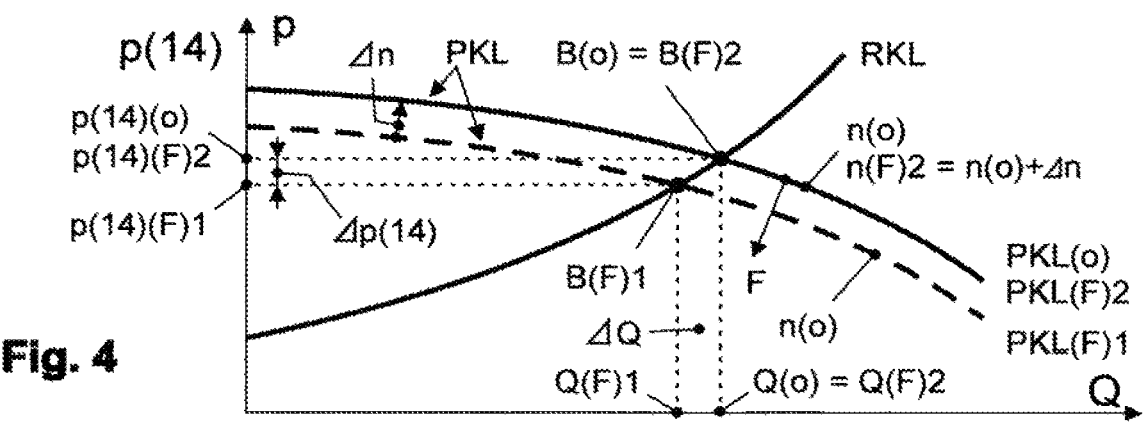
FIG. 4 shows a schematic representation of a diagram that shows the interaction of the respective pump characteristic of the centrifugal pump with the pipeline characteristic of the systems according to FIGS. 3 and 4 in the context of the control and/or regulation of heat-sensitive liquid food products.

In an initial phase of the treatment of the liquid food product P that can be seen inter alia in FIG. 4, product fouling F has not yet occurred. FIG. 4 shows a diagram for a volumetric flow Q depending on a delivery pressure p, two pump characteristics PKL for the centrifugal pump 14, and a standard pipeline characteristic RKL for the system 100. In the initial phase, the centrifugal pump 14 is operated at the initial rotational speed n(o) lying below a rated rotational speed n(N) of the centrifugal pump 14 by a given amount at its assigned pump characteristic without product fouling PKL(o). In conjunction with the standard pipeline characteristic RKL, an operating point is set without product fouling B(o). At this operating point B(o), the centrifugal pump 14 delivers a volumetric flow without product fouling Q(o) against a delivery pressure of the centrifugal pump without product fouling p(14)(o).

Figure 6:
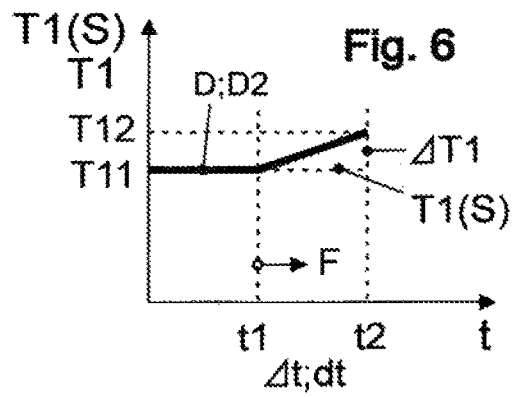
FIGS. 5 and 6 show a schematic representation of a diagram that qualitatively depicts the characteristics of the product temperature and steam temperature in the context of controlling and regulating heat-sensitive liquid food products, and on the basis of the interaction of characteristics according to FIG. 4.
Figure 5:
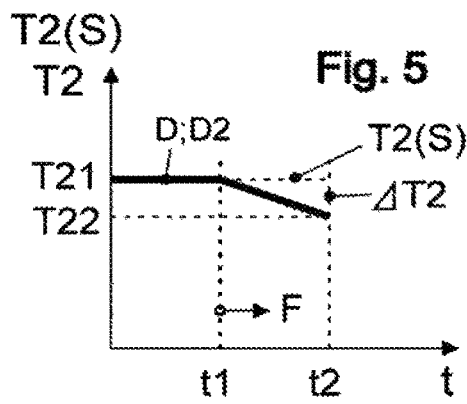
Figure 7:
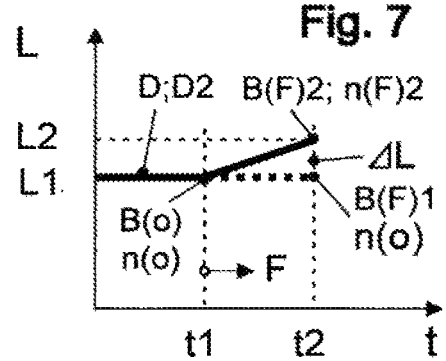
FIG. 7 shows a schematic representation of a diagram that qualitatively depicts the power consumption of the first delivery apparatus in the context of controlling and regulating of heat-sensitive liquid food products, and on the basis of the interaction of characteristics according to FIG. 4.

In the diagram for the steam temperature T1 as a function of time t (FIG. 6), for the product temperature T2 as a function of time t (FIG. 5) and for power consumption L as a function of time t (FIG. 7), the initial phase in this regard is always located to the left of a first point in time t1 at which the product fouling F should for example begin. In FIG. 6, a steam temperature without product fouling T11 is in effect that corresponds to the steam temperature setpoint T1(S) set as specified. In FIG. 5, a product temperature without product fouling T21 is in effect that corresponds to the product temperature setpoint T2(S) to be achieved as specified. In FIG. 7, power consumption without product fouling L1 of the centrifugal pump 14 is in effect that results at the operating point without product fouling B(o) from the initial rotational speed without product fouling n(o).

When product fouling F starts at the first point in time t1, the volumetric flow through the centrifugal pump 14 decreases, as shown in FIG. 4, by a volumetric flow differential ΔQ to a volumetric flow with product fouling Q(F)1 with a delivery pressure of the centrifugal pump with product fouling p(14)(F)1 reduced by a delivery pressure differential Δp(14). A first operating point with product fouling B(F)1 occurs in an associated pump characteristic with product fouling PKL(F)1 while the initial rotational speed n(o) is initially unchanged in conjunction with the approximately unchanged pipeline characteristic RKL. The reduction of the volumetric flow without product fouling Q(o) by the volumetric flow differential ΔQ to the volumetric flow with product fouling Q(F)1 at a second point in time t2 selected as an example leads to a temperature drop ΔT2 of the product temperature T2, namely from the product temperature without product fouling T21 to a product temperature with product fouling T22 (FIG. 5).

The depicted time differential t2-t1 can be a finite time differential Δt, but it can also be a differential time interval dt, wherein control and/or regulation is performed with any given number of sequential time intervals dt. The control and/or regulation should be configured for both cases. In the context of the temperature drop ΔT2 depicted in FIG. 5, a temperature rise ΔT1 in the steam temperature T1 occurs as of the first point in time t1 and up to the second point in time t2, namely from the steam temperature without product fouling T11 to a steam temperature with product fouling T12 (FIG. 6). Without remedial measures according to the invention, the temperature conditions in FIG. 5, 6 would manifest, so that the first operating point with product fouling B(F)1 in FIG. 7 with an unchanged initial rotational speed n(o) and an unchanged power consumption with product fouling L1 would be situated at the second point in time t2.

Control Phase

Upon the beginning of product fouling F at the first point in time t1, the method provides that a reduction in the volumetric flow of the centrifugal pump 14 is then counteracted by an increase in the initial rotational speed n(o) when this reduction occurs at the same time as a temperature drop ΔT2 in the product temperature T2. The initial rotational speed n(o) is increased depending on the temperature drop ΔT2 of the product temperature (T2), and/or the temperature rise ΔT1 of the steam temperature T1. The increase in the initial rotational speed n(o) as a function of the temperature drop ΔT2 and/or the temperature rise ΔT1 is continued until the product temperature setpoint T2(S) to be achieved as specified and/or the necessary steam temperature T1 to achieve the product temperature setpoint T2(S) at the start of treatment, consistently occur/occurs.

The result of the control phase is apparent from FIGS. 4 and 7. The increase in the initial rotational speed n(o) by a rotational speed differential Δn leads to a rotational speed with product fouling n(F)2=n(o)+Δn at a second operating point with product fouling B(F)2 of an associated pump characteristic with product fouling PKL(F)2. At a second operating point with product fouling B(F)2, a volumetric flow with product fouling Q(F)2 and a delivery pressure with product fouling p(14)(F)2 occur, wherein Q(F)2=Q(o) and p(14)(F)2=p(14)(o) (FIG. 4). In FIG. 7, it is apparent that in the time period at issue between the first and second point in time t1, t2, a rise in the power consumption L by the centrifugal pump 14 is discernible by a power differential ΔL from the power consumption without product fouling L1 to power consumption with product fouling L2 (second operating point with product fouling B(F)2 at the rotational speed with product fouling n(F)2) from increasing the initial rotational speed n(o) by the rotational speed differential Δn.

Both the second operating point with product fouling B(F)2 as well as an associated pump characteristic with product fouling PKL(F)2 are identical with the operating point without product fouling B(o), or respectively the pump characteristic without product fouling PKL(o). This is a necessary result because in accordance with the object, after successfully controlling and/or regulating, as presented above, the volumetric flow Q through the infuser container 10 and the adjacent centrifugal pump 14, the liquid level N and accordingly the dwell time in the infuser container 10 up to inside the centrifugal pump 14 are kept constant, and the product temperature T2 as well as the steam temperature T1 are returned to their specified setpoints T2(S), or respectively T1(S).

In an advantageous embodiment, the method according to the teachings herein provides that the increase in the initial rotational speed n(o) occurs steadily in the sense of real-time regulation. In this regard, it is furthermore proposed that the gradient of the steady increase in the initial rotational speed n(o) results from regulatory requirements, and is set depending on the temperature drop ΔT2, and/or the temperature rise T1, and/or on product-specific requirements as well.

Alternatively to the above proposal, another embodiment provides that the increase in the initial rotational speed n(o) occurs in at least one discrete step with a rotational speed differential Δn that results from regulatory requirements. In this regard, it is furthermore provided that the rotational speed differential Δn is set depending on the temperature drop ΔT2, and/or the temperature rise ΔT1, and/or product-specific requirements.

Figure 8:
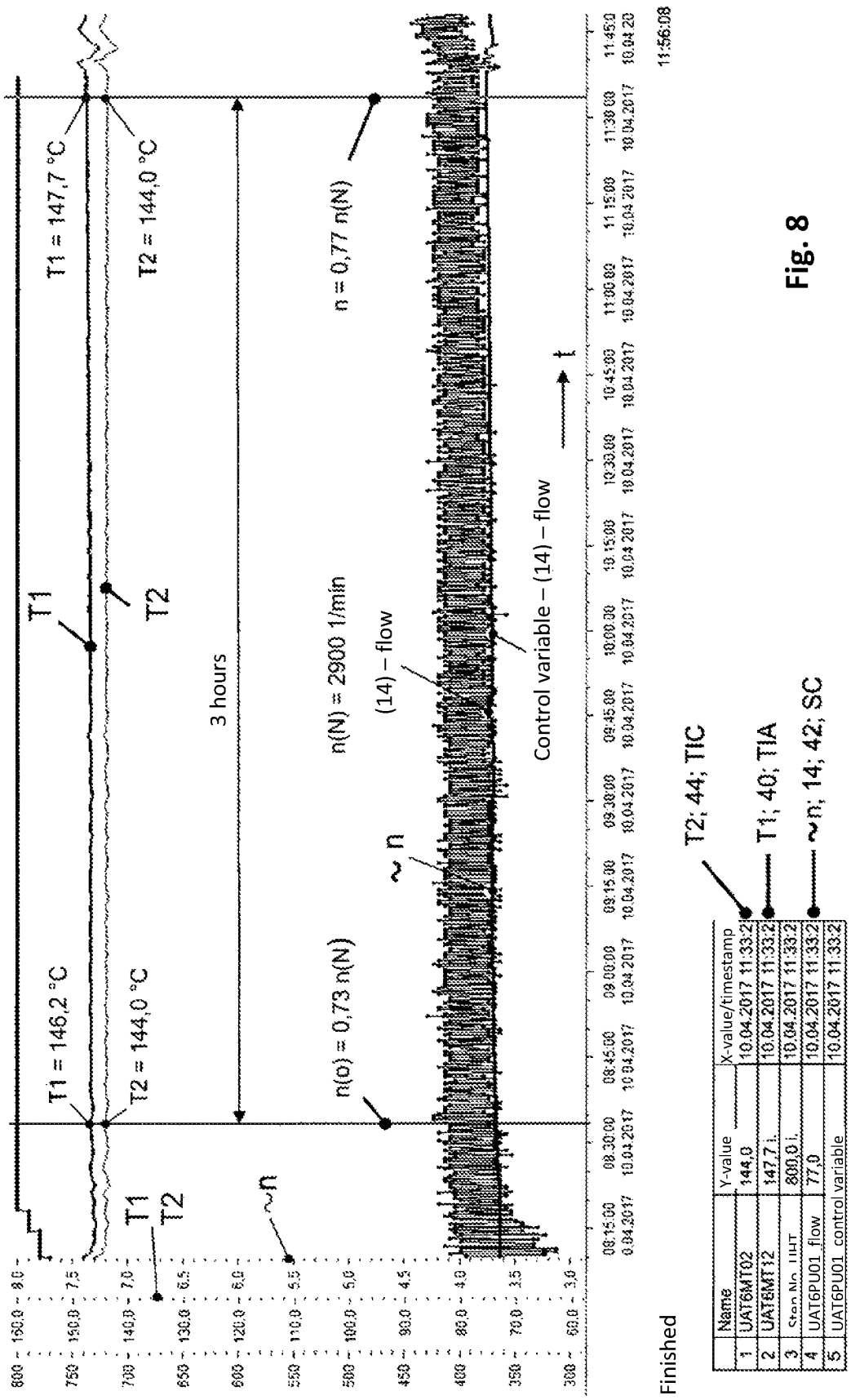
FIG. 8 shows a screen section from a graphic measuring record for a method applied to a special liquid food product.

FIG. 8 shows a screen section of a graphic measuring record for the method used for the treatment of 35,000 L of cream within a treatment period of approximately 3 hours (see time axis t, 8:33 to 11:33 o'clock). The top line in the measuring record shows the readiness of the system 100 for operation, wherein the stair-shaped beginning up to approximately 8:20 o'clock in this regard represents the starting phase of the system 100 with water. The employed centrifugal pump 14 is a centrifugal pump modified according to the invention with a rated power of 15 kW, a rated rotational speed of n(N)=2,900 rpm, and an outer diameter of the impeller wheel that was machined from 205 mm to 195 mm to rinse the pump chamber 68 and the impeller wheel 14.3 itself in the sense described below.

The treatment of the cream starts with an initial rotational speed of n(o)=2117 rpm that is 73% below the rated rotational speed of n(N)=2,900 rpm (given amount below the rated rotational speed n(N) according to step (b) of claim 1). At the end of the operating phase, the rotational speed n has risen to 77% of the rated rotational speed by increasing the rotational speed, and is therefore n=2233 rpm. The increase of the rotational speed was executed steadily as indicated by the control variable for the flow (bottom line in the graph, "control variable—(14)—flow"). The power consumption of the rotational-speed-regulated drive motor of the centrifugal pump 14 is approximately proportional to the rotational speed n of the drive motor and hence the centrifugal pump 14. The wide bar identified by "14 flow" represents the actual power consumption of the drive motor, wherein the fluctuation width of the power consumption is explained by the rotational speed regulation of the drive motor as such. The regulation of the rotational speed is realized by the centrifugal pump 14, the associated rotational speed regulating apparatus 42 (SC), and by the product-specific default parameters saved in the control and regulating apparatus 50 (FIG. 3).

The diagram according to FIG. 8 moreover clearly reveals that the requirement, namely of keeping the product temperature T2 constant despite product fouling F is satisfied very well over the entire treatment period of 3 hours with T2=144° C. The components participating therein are the temperature regulating apparatus 44 (TIC), the product-specific default parameters saved in the control and regulating apparatus 50, and the control valve 46 (FIG. 3).

The goal envisioned by the solution herein, and to be pursued in any event, of returning the steam temperature T1 at a constant product temperature T2 and over the entire treatment period of 3 hours to the value (T1(8:33 o'clock) =146.2° C.) required at the beginning of the treatment time period, or respectively also at the end, is not achieved with T1 (11:33 o'clock)=147.7° C. and hence with an associated temperature differential ΔT1=1.5° C. In the present case, an initial explanation can be offered in that, to protect to the product of cream according to the customer's wishes, the reduction of the volumetric flow of the centrifugal pump 14 by product fouling F was not entirely overcome by the necessary and possible increase in the rotational speed. A second explanation could be that reheating the infuser-heated liquid food product P' that also occurs in this region was restricted by unexpectedly strong product fouling F between the outlet opening 10.3 of the infuser container 10 and the exit from the centrifugal pump 14 despite fully compensating for a reduction in the volumetric flow Q of the central pump in this regard, and this restriction could only be permanently compensated by a steam temperature T1 higher by ΔT1=1.5° C. in the context of the method. Nonetheless, the result depicted in FIG. 8 obtained under real conditions in a production facility, and taking into account customer requirements of a gentle treatment of the customer's heat-sensitive liquid food product P, does not cast any doubt on the method; it is in contrast a confirmation of the validity of the approach of the solution herein.

Figure 9:
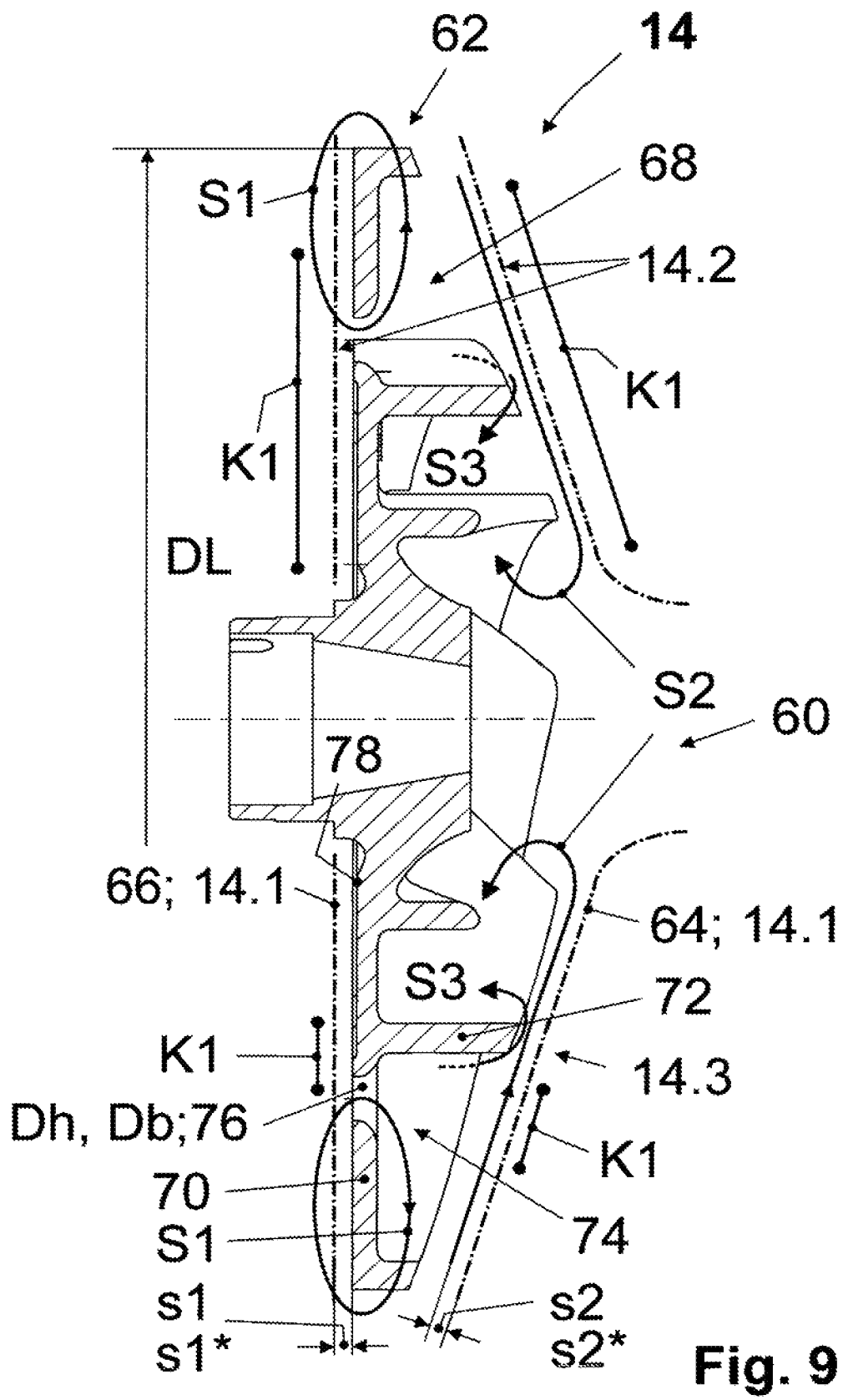
FIG. 9 shows the side view of a meridian section of the impeller of the centrifugal pump according to FIG. 2 with the approximate indication of a first, second, and third rinsing flow.

The arranged position of a centrifugal pump 14 depicted in FIG. 9 has a horizontally oriented rotational axis of a pump shaft. In conjunction with an infuser container 10, the rotational axis of the pump shaft is preferably oriented in the direction of gravity, whereby this centrifugal pump 14 can be advantageously connected by an inlet 60 that can be designed as a suction port directly to the bottom end of the drainpipe 12 discharging out of the outlet opening 10.3 in the infuser container 10. The centrifugal pump 14 in the embodiment according to the teachings herein is particularly suitable for delivering heat-sensitive liquid food products P that enter through the inlet 60 and exit out of an outlet 62 designed as a pressure port. In a manner known per se, the centrifugal pump 14 moreover possesses the pump housing 14.2 that is formed by at least a housing cover 64 and a housing rear wall 66. The pump chamber 68 which is in fluidic connection with the inlet 60 and the outlet 62 is formed in the pump housing 14.2 and accommodates the impeller wheel 14.3. The impeller wheel 14.3 with its blades 72 and the blade channels 74 formed by them is designed open toward the housing cover 64 and closed to the housing rear wall 66 by an impeller wheel rear side 70. The impeller wheel rear side 70 is at a distance from the housing rear wall 66 by a rear impeller wheel gap s1. A front side of the impeller wheel 14.3 substantially formed by the front edges of the blades 72 is also at a distance from the housing cover 64 by a front impeller wheel gap s2. The inlet 60, the housing cover 64 and the housing rear wall 66 can be bordered entirely or partially, for example in the form of a pump-housing-side coolant chamber 14.1 for the purpose of the first cooling K1.

The front impeller wheel gap s2 is increased in comparison to a minimum front impeller wheel gap s2\* that ensures the mechanical functioning of the centrifugal pump 14 by reducing the width of the impeller wheel 14.3, namely such that it undergoes a maximum enlargement at an outer diameter DL of the impeller wheel 14.3 which preferably decreases continuously into the region of the entrance into the blade channels 74 to the minimum front impeller wheel gap s2\*, and the reduction of the width of the impeller wheel 14.3 at the outer diameter DL is 40 to 50% of the width of a hydraulically optimized impeller wheel.

Each blade channel 74 of the impeller wheel 14.3 between two adjacent blades 72 is fluidically connected to the rear impeller wheel gap s1 in the region of its adjacent impeller wheel rear side 70 by at least one rinsing hole 76 that penetrates the impeller wheel rear side 70. The geometric location for the respective penetration site of the rinsing hole 76 in the impeller wheel rear side 70 is determined by the middle of the blade channel 74 relative to the spacing of the blades 72 at the penetration site, and approximately by the middle of a maximum flow string length of the blade channel 74 between its entrance and exit. All rinsing holes 76 in this case are preferably arranged on a single circle of holes.

Another preferred embodiment provides that the access to a minimum rear, radially-oriented impeller wheel gap s1\* that ensures the mechanical functioning of the centrifugal pump 14 and that begins at the outer diameter DL of the impeller wheel 14.3 is increased by up to 5 mm by reducing the outer diameter DL. A necessary and desirable enlargement of the rear impeller wheel gap s1 exists in that the impeller wheel rear side 70 undergoes an annular drilling out 78 in the region between the rinsing hole 76 and a hub of the impeller wheel 14.3 with an axial depth of up to 2 mm.

The rinsing hole 76 is either designed preferably circular with a hole diameter Db, or it alternatively has a shape that deviates from the circular shape with a hydraulic diameter Dh that is standard for this shape, wherein the hydraulic diameter Dh is dimensioned as a quotient in a known manner from four times the passage cross-section of the rinsing hole 76 and the circumference of the rinsing hole 76. In this case, it is preferably suggested that the hole diameter Db or the hydraulic diameter Dh is 30 to 50% of the spacing of the blades 72 at the penetration site of the rinsing hole 76.

Finally, FIG. 9 shows, approximately and schematically indicated, a first rinsing flow S1, a second rinsing flow S2, and a third rinsing flow S3, which will be explained in greater detail below.

The following measures with which a centrifugal pump according to the prior art, preferably a commercially available centrifugal pump, is to be modified according to the invention, ensure the rinsing of the impeller wheel 14.3 in combination with each other or also considered by themselves.

First, the centrifugal pump may be modified to widen the rear impeller wheel gap s1 and/or the front impeller wheel gap s2 (see FIG. 9), either by drilling out the impeller wheel 14.3 on both sides, or by an axially effective spacer element in the direction of a pump shaft that is arranged at the connecting point between the housing cover 64 and the housing rear wall 66, wherein the impeller wheel 14.3 is not axially offset relative to the housing rear wall 66, or is correspondingly axially offset on or with the pump shaft in the pump chamber 68.

Further, the centrifugal pump may be modified to arrange the aforementioned rinsing holes 76 in the above-described manner.

By widening the rear impeller gap s1, or respectively by the expanded access thereto, the associated rear wheel side chamber is impinged upon over its entire radial area of extension more or less unrestrictedly by the static pressure predominating at the exit side of the impeller wheel 14.3 that possesses the outer impeller wheel diameter DL at that location. In the blade channel 74, there is less static pressure at the respective rinsing hole 76 than in the rear wheel side chamber. In the blade channel 74, this yields the first rinsing flow S1 directed from the inside to the outside. When the treated liquid food product P* located in the rear wheel side chamber is cooled if appropriate at the housing rear wall 66 because the first cooling K1 is provided there if appropriate, treated liquid food product P* permanently cooled by the first rinsing flow S1 preferably passes into the core region of the flow in the blade channel 74.

By means of the described widening of the front impeller wheel gap s2, the third rinsing flow S3 can form viewed over the respective end face front edge of the blades 72 and over their axial area of extension. The propulsion forces for this third rinsing flow S3 result from the difference in pressure at each blade 72 that exists from the static pressure on the blade top side, a pressure side, and by the static pressure on the blade bottom side, a suction side. The third rinsing flow S3 brings about an exchange of the treated liquid food product P* into and out of the core region of the flow in the associated blade channel 74.

Due to the wider front impeller wheel gap s2, a radially oriented second rinsing flow S2 can form due to the difference in the static pressure at the exit of the impeller wheel 14.3 and the static pressure in the suction side entrance of the impeller wheel 14.3 that overlaps the third rinsing flow S3 in a more or less perpendicular manner Here as well, this second rinsing flow S2 brings about an exchange of the treated liquid food product P* into and out of the core region of the flow in the associated blade channel 74.

The following is a list of reference numbers used in the drawing figures as indicated.

FIG. 1 (Prior Art)
100 System
10 Infuser container (general)
10.4 Container-bottom-side coolant chamber
12 Drainpipe
12.1 Drainpipe-side coolant chamber
14 First delivery apparatus
14.1 Pump-housing-side coolant chamber
16 Vacuum chamber
18 Second delivery apparatus
20 Product inlet
22 External steam inlet
24 Internal steam inlet
26 Pump-side coolant entrance
28 Infuser-side coolant exit
30 Connecting line
32 Vapor exit
34 Drain line—(for treated food product)
D Steam
D1 External steam
D2 Internal steam
K Cooling
P Liquid food product
P' Infuser-heated liquid food product
P* Treated liquid food product
W Water FIGS. 2 and 3
10 Infuser container
10.1 Container jacket
10.2 Container bottom
10.3 Outlet opening
10.4 Container-bottom-side coolant chamber
10.4.1 Third coolant entrance
10.4.2 Third coolant exit
12 Drainpipe
12.1 Drainpipe-side coolant chamber
12.1.1 Second coolant entrance
12.1.2 Second coolant exit
14 Centrifugal pump
14.1 Pump-housing-side coolant chamber
14.1.1 First coolant entrance
14.1.2 First coolant exit
14.2 Pump housing
14.3 Impeller wheel
24.1 Steam line
40 Temperature measuring apparatus
42 Rotational speed regulating apparatus
44 Temperature regulating apparatus
46 Control valve (for steam D, D2)
48 Signal line
50 Control and regulating apparatus
K1 First cooling (of the pump housing 14.2)
K2 Second cooling (of the drainpipe 12)
K3 Third cooling (of the container bottom 10.2)
N Liquid level
SC Rotational speed regulation
T1 Steam temperature (steam D, D2)
T1(S) Steam temperature setpoint (steam D, D2)
TIA Temperature display and alarm
T2 Product temperature (infuser-heated food product P')
T2(S) Product temperature setpoint
TIC Temperature display and regulation
a, b, d, d Connections (control and regulation apparatus 50 and (40, 42, 44, 46))
h Drop height
Δh Change in the liquid level
p(14) Delivery pressure of the centrifugal pump
n Rotational speed (in rpm or rotational frequency in rps)

FIGS. 4 to 8
F Product foulings
B(o) Operating point without product fouling
B(F)1 First operating point with product fouling—(at n(o))
B(F)2 Second operating point with product fouling—(at n(F)2=n(o)+Δn)
L Power consumption—(centrifugal pump 14)
L1 Power consumption without product fouling—(at n(o))
L2 Power consumption with product fouling—(at n(F)2=n(o)+Δn)
ΔL Power differential
PKL Pump characteristic, general
PKL(o) Pump characteristic without product fouling—(at n(o))
PKL(F)1 Pump characteristic with product fouling—(at n(o))
PKL(F)2 Pump characteristic with product fouling—(at n(F)2=n(o)+Δn)
Q Volumetric flow—(general)
Q(o) Volumetric flow without product fouling—(at n(o))
Q(F)1 Volumetric flow with product fouling—(at n(o))
Q(F)2 Volumetric flow with product fouling—(at n(F)2=n(o)+Δn)
ΔQ Volumetric flow differential
RKL Pipeline characteristic T11 Steam temperature without product fouling (=T1(S))
T12 Steam temperature with product fouling
ΔT1 Temperature rise (from product fouling)
T21 Product temperature without product fouling (=T2(S))
T22 Product temperature with product fouling
ΔT2 Temperature drop (from product fouling)
n(o) Initial rotational speed (without product fouling)
n(F)2 Rotational speed with product fouling at the second operating point—(at B(F)2)
n(N) Rated rotational speed—(of the centrifugal pump 14 at the design point)
Δn Rotational speed differential (or respectively rotational frequency differential)
P Delivery pressure (general)
p(14)(o) Delivery pressure of the centrifugal pump without product fouling (at B(o))
p(14)(F)1 Delivery pressure of the centrifugal pump with product fouling (at B(F)1)
p(14)(F)2 delivery pressure of the centrifugal pump with product fouling (at B(F)2)
Δp(14) Delivery pressure differential
t Time—(general)
t1 First point in time—(start of product fouling)
t2 Second point in time—(increased product fouling)
Δt Finite time difference
dt Differential time difference
FIG. 9
14 Centrifugal pump
14.1 Pump-housing-side coolant chamber
14.2 Pump housing
14.3 Impeller wheel
60 Inlet (suction port)
62 Outlet (pressure port)
64 Housing cover
66 Housing rear wall
68 Pump chamber
70 Impeller wheel rear side
72 Blade
74 Blade channel
76 Rinsing hole
78 Annular drilling out
DL Outer impeller wheel diameter
Db Hole diameter
Dh Hydraulic diameter
K1 First cooling (of the pump housing 14.2)
S1 First rinsing flow
S2 Second rinsing flow
S3 Third rinsing flow
s1 Rear impeller wheel gap
s1* Minimum rear impeller wheel gap
s2 Front impeller wheel gap
s2* Minimum front impeller wheel gap

The invention claimed is:

1. A method for controlling and/or regulating treatment of a heat-sensitive liquid food product, comprising:
heating the liquid food product directly with steam to establish a germ-free state in an infuser container;
removing water from the liquid food product by flash evaporation at a low pressure in an amount that corresponds to that of the previously supplied steam;
delivering the liquid food product by means of a centrifugal pump between heating and flash evaporation; and
cooling the liquid food product in at least one section of this flow path by each associated wall bordering this flow path starting upon entry into a base region of the infuser container and at most until entering the centrifugal pump, wherein:
the centrifugal pump has an inlet, an outlet, and a pump housing that is formed by at least a housing cover and a housing rear wall, and in which pump housing a pump chamber is formed which is in fluidic connection with the inlet and the outlet,
the centrifugal pump has an impeller wheel rotatably accommodated in the pump chamber, and the impeller wheel is designed open toward the housing cover and closed to the housing rear wall by a rear side of the impeller wheel,
the centrifugal pump has a front impeller wheel gap provided between the housing cover and the impeller wheel, and a rear impeller wheel gap provided between the housing rear wall and the impeller wheel,
the front impeller wheel gap is increased up to several times in comparison to a minimum front impeller wheel gap that ensures mechanical functioning of the centrifugal pump by reducing a width of the impeller wheel,
the front impeller wheel gap undergoes a maximum increase at an outer diameter of the impeller wheel that decreases to the minimum front impeller wheel gap into a region of an entrance into blade channels of the impeller wheel, and
a reduction of the width of the impeller wheel at the outer diameter of the impeller wheel is 40 to 50% of the width of a hydraulically optimized impeller wheel;
and the method comprising:
(a) detecting a product temperature downstream after the centrifugal pump of an infuser-heated liquid food product and regulating the product temperature by supplying steam at a steam temperature to a head region of the infuser container at a product-specific product temperature setpoint to be achieved as specified, wherein a drop in the product temperature causes a rise, and a rise in the product temperature causes a drop, in the steam temperature;
(b) operating the centrifugal pump in an initial phase of the treatment of the liquid food product at an initial rotational speed below a rated rotational speed of the centrifugal pump by a predetermined amount, wherein the initial rotational speed is dependent on at least one of the liquid food product or a design of the centrifugal pump;
(c) counteracting a reduction of the volumetric flow of the centrifugal pump by increasing the initial rotational speed when the reduction occurs at the same time as a temperature drop of the product temperature;
(d) increasing the initial rotational speed depending on at least one of the temperature drop of the product temperature or a temperature rise of the steam temperature, wherein an extent of the increase in the initial rotational speed results from a regulatory requirement to keep at least the product temperature constant; and
(e) repeating steps (c) and (d) until at least one of a specified product temperature setpoint to be achieved or the steam temperature needed to achieve the product temperature setpoint at the start of treatment, consistently occurs.

2. The method according to claim 1, wherein the increase in the initial rotational speed occurs steadily.

3. The method according to claim 2, wherein a gradient of the increase in the initial rotational speed results from regulatory requirements, and is set depending on at least one of the drop in the product temperature, the rise in the product temperature, or on product-specific requirements.

4. The method according to claim 3, wherein at least one of the initial rotational speed or the product temperature setpoint is set depending on default parameters that are characteristic of the liquid food product, wherein the default parameters are selected from a group consisting of physical variables of the liquid food product, density of the liquid food product, viscosity of the liquid food product, thermal conductivity of the liquid food product, composition of the liquid food product, fat content of the liquid food product, and protein content of the liquid food product.

5. The method according to claim 3, wherein at least one of the initial rotational speed or the product temperature setpoint is adjusted depending on physical boundary conditions to which the method is subjected, wherein the physical boundary conditions are selected from a group consisting of process-related default parameters of the method, pressure of the method, and temperature of the method.

6. The method according to claim 3, wherein at least one of the initial rotational speed, the product temperature setpoint, or either of a rotational speed differential and a gradient of the increase in the initial rotational speed is adjusted by means of a calibration function tested and saved before or while starting the method.

7. The method according to claim 3, further comprising:
supplying the liquid food product annularly, and impinging the liquid food product from the inside by internal steam and from the outside by external steam, and
the supply of the external steam is adjusted depending on a required supply pressure for the internal steam in the head region of the infuser container, and by differential pressure regulation.

8. The method according to claim 2, wherein at least one of the initial rotational speed, the product temperature setpoint, or either of a rotational speed differential and a gradient of the increase in the initial rotational speed is adjusted by means of a calibration function tested and saved before or while starting the method.

9. The method according to claim 2,
wherein at least one of the initial rotational speed or the product temperature setpoint is set depending on default parameters that are characteristic of the liquid food product, wherein the default parameters are selected from a group consisting of physical variables of the liquid food product, density of the liquid food product, viscosity of the liquid food product, thermal conductivity of the liquid food product, composition of the liquid food product, fat content of the liquid food product, and protein content of the liquid food product.

10. The method according to claim 2, wherein at least one of the initial rotational speed or the product temperature setpoint is adjusted depending on physical boundary conditions to which the method is subjected, wherein the physical boundary conditions are selected from a group consisting of process-related default parameters of the method, pressure of the method, and temperature of the method.

11. The method according to claim 2, further comprising:
supplying the liquid food product annularly, and impinging the liquid food product from the inside by internal steam and from the outside by external steam, and
the supply of the external steam is adjusted depending on a required supply pressure for the internal steam in the head region of the infuser container, and by differential pressure regulation.

12. The method according to claim 1, wherein the increase in the initial rotational speed occurs in at least one discrete step with a rotational speed differential that results from regulatory requirements.

13. The method according to claim 12, wherein the rotational speed differential is set depending on at least one of the drop in the product temperature, the rise in the product temperature, or product-specific requirements.

14. The method according to claim 12, wherein at least one of the initial rotational speed or the product temperature setpoint is set depending on default parameters that are characteristic of the liquid food product, wherein the default parameters are selected from a group consisting of physical variables of the liquid food product, density of the liquid food product, viscosity of the liquid food product, thermal conductivity of the liquid food product, composition of the liquid food product, fat content of the liquid food product, and protein content of the liquid food product.

15. The method according to claim 12, wherein at least one of the initial rotational speed or the product temperature setpoint is adjusted depending on physical boundary conditions to which the method is subjected, wherein the physical boundary conditions are selected from a group consisting of process-related default parameters of the method, pressure of the method, and temperature of the method.

16. The method according to claim 12, wherein at least one of the initial rotational speed, the product temperature setpoint, or either of a rotational speed differential and a gradient of the increase in the initial rotational speed is adjusted by means of a calibration function tested and saved before or while starting the method.

17. The method according to claim 12, further comprising:
supplying the liquid food product annularly, and impinging the liquid food product from the inside by internal steam and from the outside by external steam, and
the supply of the external steam is adjusted depending on a required supply pressure for the internal steam in the head region of the infuser container, and by differential pressure regulation.

18. The method according to claim 1, wherein at least one of the initial rotational speed or the product temperature setpoint is set depending on default parameters that are characteristic of the liquid food product, wherein the default parameters are selected from a group consisting of physical variables of the liquid food product, density of the liquid food product, viscosity of the liquid food product, thermal conductivity of the liquid food product, composition of the liquid food product, fat content of the liquid food product, and protein content of the liquid food product.

19. The method according to claim 1, wherein at least one of the initial rotational speed or the product temperature setpoint is adjusted depending on physical boundary conditions to which the method is subjected, wherein the physical boundary conditions are selected from a group consisting of process-related default parameters of the method, pressure of the method, and temperature of the method.

20. The method according to claim 1, further comprising:
supplying the liquid food product annularly, and impinging the liquid food product from the inside by internal steam and from the outside by external steam, and
the supply of the external steam is adjusted depending on a required supply pressure for the internal steam in the head region of the infuser container, and by differential pressure regulation.

* * * * *